United States Patent [19]
Lachnit

[11] 3,920,427
[45] Nov. 18, 1975

[54] APPARATUS FOR THE PURIFICATION OF COMBUSTION GASES

[75] Inventor: Friedrich Lachnit, Mulheim (Ruhr), Germany

[73] Assignee: Deutsche Babcock & Wilcox A.G., Oberhausen, Germany

[22] Filed: Dec. 11, 1973

[21] Appl. No.: 423,673

[30] Foreign Application Priority Data
Dec. 15, 1972 Germany............................. 2261304
Oct. 11, 1973 Germany............................. 2351001

[52] U.S. Cl. ....................... 55/418; 55/479; 55/482; 55/518
[51] Int. Cl.².......................................... B01D 51/00
[58] Field of Search ............. 55/74, 96, 97, 98, 286, 55/410, 417, 418, 419, 485, 479, 432, 512, 515, 516, 517, 518, 519, 484, 472, 474, 476, 309, 286, 287, 294; 210/264, 268, 269, DIG. 13; 23/288 G

[56] References Cited
UNITED STATES PATENTS

| | | |
|---|---|---|
| 655,635 | 8/1900 | Morse................................... 55/286 |
| 994,282 | 6/1911 | Spilsbury............................... 55/484 |
| 1,782,823 | 11/1930 | Hechenbleikner.................... 55/476 |
| 1,982,099 | 11/1934 | Hechenbleikner.................... 55/479 |
| 2,835,560 | 5/1958 | Bason et al. ........................ 23/288 R |

FOREIGN PATENTS OR APPLICATIONS

| | | | |
|---|---|---|---|
| 450,048 | 7/1936 | United Kingdom................... 55/474 |
| 393,037 | 6/1933 | United Kingdom................... 55/474 |
| 243,117 | 11/1925 | United Kingdom................... 55/474 |
| 1,095,446 | 12/1960 | Germany.............................. 55/418 |

*Primary Examiner*—Frank W. Lutter
*Assistant Examiner*—David L. Lacey
*Attorney, Agent, or Firm*—Frank J. Jordan

[57] ABSTRACT

Apparatus for purifying combustion gases includes a housing in which there is arranged two perforated walls which are substantially vertically disposed. The two perforated walls are spaced from one another to define therebetween a filtering chamber in which a filtering material is disposed. Partitioning means partition the filtering chamber into a plurality of segments, and control means are provided for controlling the flow of combustion gases by excluding at least two segments from the flow of combustion gases.

11 Claims, 5 Drawing Figures

APPARATUS FOR THE PURIFICATION OF COMBUSTION GASES

BACKGROUND OF THE INVENTION

This invention relates to an apparatus for the purification of combustion gases utilizing a filtering layer which is contained between two approximately vertical perforated walls.

Apparatus of this general type is known from German DAS 1,946,457 wherein a layer of filtering material is provided through which combustion gases move continually downward between louvered walls thus allowing the impurities (sulphur bearing gases, dust, particles and the like) to attach themselves to the filtering material.

This well known moving layer device has the disadvantage that the layer of filtering material does not move uniformly downward, that is, the profile and speed of migration of the filtering material is distributed or scatters poorly. Research has shown that the differences of speed in a moving layer device with fixed louvres vary in the range of multiples of whole numbers. Here especially, the layers close to the wall move particularly slowly due to the friction with the wall and the pronounced intrusion into the louvre spaces. The speed of travel must be chosen so that these slowly moving layers do not plug up due to sintering because one of the layers close to the wall is directly exposed to the hot combustion gases containing the impurities. Thus layers at a further distance from the walls acquire a travelling speed too large to exhaust their capacity for the absorption of sulphurous gases. An insufficient loading of the filtering mass leads to an insufficient desorption cycle, a fact which makes the economical use of the apparatus questionable or doubtful.

Another disadvantage of these well known moving layer devices is that they are not as efficient dust filters as the extremely fine filtering electrostatic filters. Dust is always shaken off by the internal grinding movements and the friction on the wall, and in fact dust even increases due to the abrasion of the filtering layers (usually coke). Thus a complete purification has up to now always required an electrostatic filter of large capacity connected in series.

Accordingly, an object of the present invention is to overcome the disadvantages of these known prior art arrangements and to provide an apparatus for the purification of combustion gases utilizing a filtering layer which is situated between two approximately vertical perforated walls, thus allowing an optimal loading of the filtering material with sulphurous gases, and also being particularly capable of filtering out dust and other particles.

The aforementioned object is obtained, according to the present invention, by dividing into segments the layer of the filtering mass which is adjacent to the walls by at least four vertically arranged intermediate walls, and that means for the regulation of the supply of the combustion gases are arranged in such a way that selectively two of the segments are excluded or blocked off from the admission of combustion gases. An apparatus for the purification of combustion gases of this kind allows a particularly advantageous intermittent operation of parts of the apparatus. The filtering layer is at rest in all segments reached by the combustion gases so that the charging of the filtering layer with sulphurous gases or dust may be optimized. The filtering out of dust is particularly effective because no grinding movements occur in the segments thus allowing a considerable reduction in the capacity of the electrostatic filters which are serially connected to the dust filter. One of the two segments that are not reached by the combustion gases is emptied while the other is filled with fresh or purified filter material.

Another advantage of the apparatus according to the present invention is the fact that a continuously operating desorption apparatus may be used despite the immobility of the filtering material during the filtering phase because one segment is always emptied while another one is being filled, and these emptying and filling processes may be adapted to the continuous flow of material in the desorption apparatus.

A particularly advantageous feature of the apparatus according to the present invention is distinguished by the fact that the walls for the layer of filtering material consist of concentrically arranged cylindrical surfaces arranged so that the combustion gases pass through the layer of filtering material from the inside towards the outside, and the layer of filtering material, which is circular in cross section, is partitioned into segments by at least four radial and vertical intermediate walls. This method of circular building is not only advantageous from the point of view of construction expenses, but is also advantageous as regards to the speed of the combustion gases flowing through the filtering layer from the inside towards the outside. Thus by crossing through the layer of filtering material, whose breadth increases from the inside towards the outside, the velocity of the combustion gases decreases to about one-half of the velocity at their introduction, thus giving an exceedingly advantageous load profile of the filtering material. This applies to the concentration of the sulphurous part as well as to the deposition of dust.

The maximum velocity of the combustion gases escaping from the louvered walls must be limited in order to prevent entrainment of filtering material. The initial speed is not allowed to surpass the escape speed in the case of flat filtering layers, but the circular building method as outlined in this invention allows an initial velocity approximately twice as high as the escape velocity.

Furthermore, it is advantageous that 16 intermediate walls be provided which extend from the center of the cylindrically shaped walls through the layer of filtering material, and that the introduction of the combustion gases is controlled by a rotatable distributing shutter. Thus 16 cross sections are provided each capable of receiving combustion gases, but two of these cross sections are closed as the case may be. The expenses of building such a regulation feature as regards to the introduction of combustion gases are minimal. The combustion gases are preferably introduced at the top so that the rotatable shutter of a double segment may be actuated in unison with the filling mechanism.

The filling mechanism consists preferably of an entrance tube which is solidly connected with a rotatable shutter, and a braking mechanism for the filtering material. The braking mechanism gently absorbs the kinetic energy of the filtering material which drops into the segment chute so that increased abrasion of the filtering material is prevented while it falls through the chute.

Another advantage of the present invention is the fact that the segments of filtering material force the combustion gases to flow in each segment in opposite directions during each loading or filtering cycle. This reversal of the direction of flow of the combustion gases in each segment prevents the loading profile of the filtering material from diminishing steadily and unilaterally from the entrance side towards the exist side. Generally, the filtering material will be used uniformly, and may be utilized up to the economic limit of its adsorptive powers. This it is possible to reduce the size of the intermittently used installation for the purification of the combustion gases, and still keep residual sulphur dioxide content equally low because less filtering material is needed. Thus it is possible to optimize the adsorption process as to its cost as well as to its operational effect.

It is advisable to direct the flow of the combustion gases through the segments of the filtering mass at the beginning of the load or filter cycle from the outside towards the inside, and to direct the flow when nearing the end of the cycle from the inside towards the outside. When using the annular layer of filtering material, the reversal of the direction of flow takes place in such a manner that at the more difficult end of the loading cycle, the dynamically more advantageous direction of flow, that is, from the inside towards the outside, is chosen. This mode is preferable because the adsorptive capacity of the filtering material always decreases with increased loading.

When the combustion gases are introduced into the purifying mechanism through the space above the layer of filtering material and are exhausted through the bottom of this layer, the reversal of the direction of flow is actuated by a simple distributing mechanism consisting of sealing plates. This distributing mechanism consists, according to a further feature of the present invention, in providing slidable sealing plates which are positioned at the top and at the bottom of the channels which surround the layer of filtering material and which serve as the inlets and the outlets for the combustion gases. The sealing plates belonging to or associated with each segment of filtering material are alternatingly closed at the top or at the bottom of a segment with the exception of those plates which are shut at both ends in order to serve as the actuating closures for leak-free regulation. The sealing plates do not have to overlap more than a minimum surface when the aforementioned method of introduction and removal of gases is used. The plates themselves lie loosely upon the respective surfaces and are held in place by the pressure of the gases. The rotating distributor shutter may be rotated every two hours so that when 16 segments of filtering mass are provided, one complete revolution of the shutter will occur in 32 hours. At this rate of rotation, there is negligible or no abrasion between the rotating shutter and the fixed segments.

It is possible to increase the size of the mechanism for the purification of combustion gases according to this present invention because, by another preferred feature of this invention, the existing annular layer of filtering material is surrounded modularly and concentrically by another annular layer which is separated from the first annular layer by a common gas exhaust channel. In this latter embodiment the combustion gases first flow through the exterior layer of the filtering material from the outside towards the inside because it carries the larger share of adsorption, and later on, as loading increases, as described above, such combustion gases flow from the inside towards the outside.

Finally, the uppermost parts of the walls surrounding the layers of filtering material is constructed free of openings at a height larger than the radial width of the layers of filtering material. Thus the part of the filtering material which is behind these closed sectors of the wall is exposed to the combustion gases from the top down. This construction ensures that this part of the filtering mass will be traversed vertically or from the top down. Accordingly, the danger of stationary temperature regions lying close to the limits of flammability of the filter coke is prevented. This could arise if these uppermost parts of the filtering material were traversed horizontally, but the provision of the aforementioned closed wall construction prevents this from happening.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departure from the spirit of the invention and within the scope and range of equivalents of the claims.

SUMMARY OF THE INVENTION

Apparatus for the purification of combustion gases includes a housing having an inlet means for admitting combustion gases and an outlet means for discharging purified combustion gases. Within the housing there is arranged two perforated walls which are substantially vertically disposed. The two perforated walls are spaced from one another to define therebetween a filtering chamber in which a filtering material is disposed. Partition means are provided to partition the filtering chamber into a plurality of segments and control means are provided for controlling the flow of combustion gases by excluding at least two segments from the flow of combustion gases, whereby the filtering material in the two excluded segments may be reconditioned or replaced with fresh filtering material.

DESCRIPTION OF THE PREFERRED EMBODIMENTS

Figure 1:
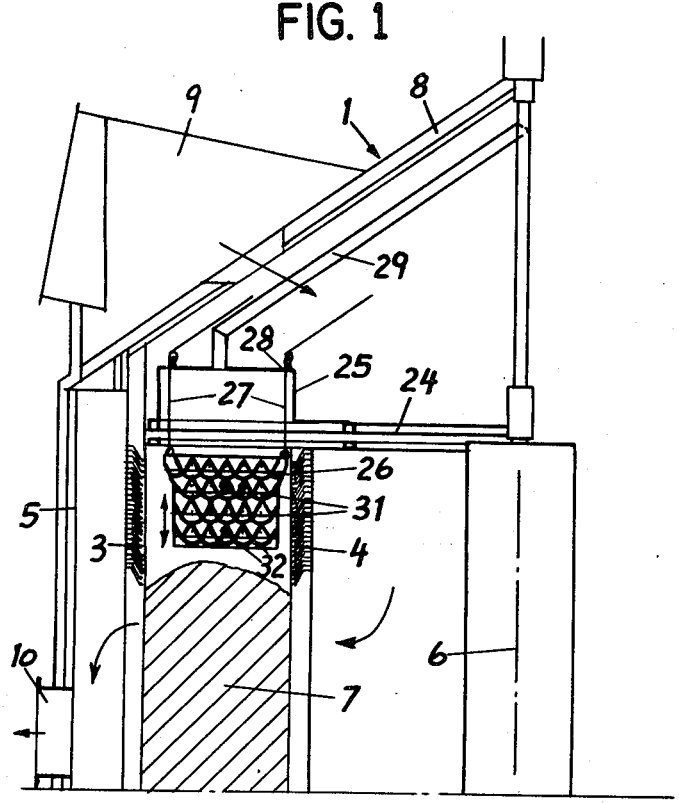
FIG. 1 is a partial longitudinal sectional view of a purification apparatus according to one embodiment of the invention.
Figure 2:
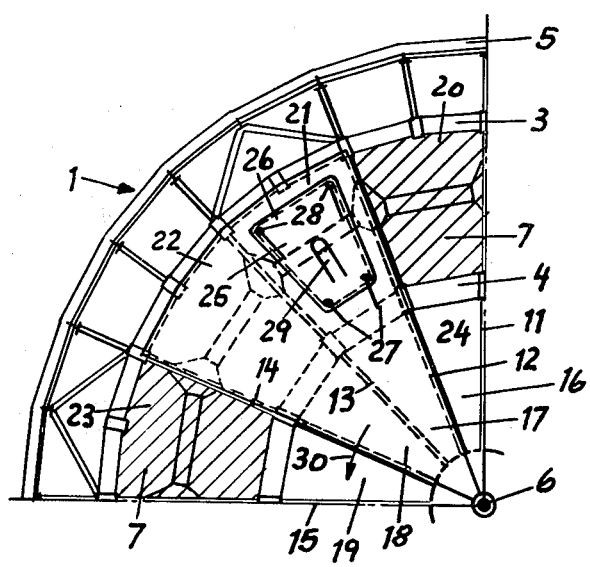
FIG. 2 is a plan view of the apparatus in FIG. 1 showing the rotatable distribution shutter and the filling means.

Referring to the drawings, there is shown in FIGS. 1 and 2 an apparatus 1 for the purification of combustion gases. The apparatus includes two cylindrical walls 3 and 4 surrounded by a housing frame 5. The walls 3 and 4 are of a louvre-like construction and are arranged concentrically around a central axis 6. A filtering mass 7 is located in the space between the walls 3 and 4. The apparatus 1 is covered by a cone-shaped roof 8 provided with a connecting inlet conduit 9 for the combustion gases which are to be purified. In the outer wall of the frame 5 there is provided another connecting conduit 10 for the discharge of purified gases.

As can be seen in FIG. 2, radial vertical intermediate partitions 11, 12, 13, 14 and 15 are positioned inside the apparatus 1 and divide the apparatus into a total of 16 parts. Only five of these intermediate partitions are shown in FIG. 2 because the latter figure shows only a quarter of the entire apparatus 1. The intermediate partitions 11, 12, 13, 14, 15 divide the interior space bounded by the wall 4 into a plurality of cross sections forming feeder sections 16, 17, 18, 19 for combustion gases. The intermediate partitions 11, 12, 13, 14, 15 also divide the annular space formed between the walls 3 and 4 into segments 20, 21, 22 and 23. In FIG. 2 the feeder sections 17, 18 and the segments 21, 22 are closed by a rotatable distributor closure shutter 24 which is rotatable around the axis 6. The rotating distributor closure or shutter 24 includes a cap or cover 25 which is capable of receiving a braking frame 26, to be hereinafter described in greater detail, during the rotation of the distributor closure 24. After segments 20, 21, 22, and 23 have been individually drained of filtering material, as will be described in greater detail hereinafter, the braking frame 26 which is suspended by ropes or cables 27 is introduced into the individual segment, which has been drained, through an opening 28 in the cap 25. A feeding pipe 29 for the filtering material is pivotal around the central axle 6 and also enters the cap 25.

The apparatus described above operates as follows. The feeder sections 17, 18 as well as the segments 21 and 22 are closed off by the rotatable distributor shutter 24 so that the incoming combustion gas enters only the other segments 20, 23 and not the segments 21 and 22 which contain the filtering material 7. At this point the saturated filtering material contained in segment 22 is drained or removed while the segment 21 is charged with fresh filtering material through an inlet pipe 29. Distributor shutter 24 together with inlet pipe 29 moves 1/16 of a revolution in the direction of arrow 30 after each discharging and charging operation. Thus, after the distributor shutter 24 has moved 1/16 of a revolution, segments 22 and 23 are closed by the distributor shutter 24. The combustion gases may now traverse or pass through the segment 21 which is filled with fresh filtering material. The discharging and charging operations may now begin in the segments 23 and 22 respectively, whereby segment 22 which had been previously emptied of saturated filtering material is now filled with fresh filtering material and segment 23 is emptied of saturated filtering material.

From the above description it will be seen that 14 of the 16 segments are always capable of purifying the combustion gases while the filtering mass is being charged or discharged in the other two segments. Charging and discharging of the filtering mass occurs continuously with the exception of the short intervals needed for the rotation of the shutter 24, so that continuous desorption equipment for the used filtering mass may be easily coupled to the purifying apparatus.

FIG. 1 shows also how the brake frame 26 allows charging of the segments (for example segment 21 in the illustrated embodiment) in a non-abrasive manner. Within the brake frame 26 are positioned tension wires 31 in which rounded brake members 32 made from dead soft silicone rubber or a tough, ductile rubber are attached, alternatively side by side and also alternatingly one above the other. During the charging operation, the brake from 26 is pulled continuously upwardly with the aid of the cables 27 in such a way that there is maintained a constant small distance between the brake frame 26 and the top of the layer of filtering material. The main part of the kinetic energy of the falling particles of filtering material will thereby be absorbed by the dead soft brake members 32 whereby damage is prevented to the frequently expensive and valuable filtering material in that there is a free drop through a relatively long distance on to the rubber material.

Figure 3:
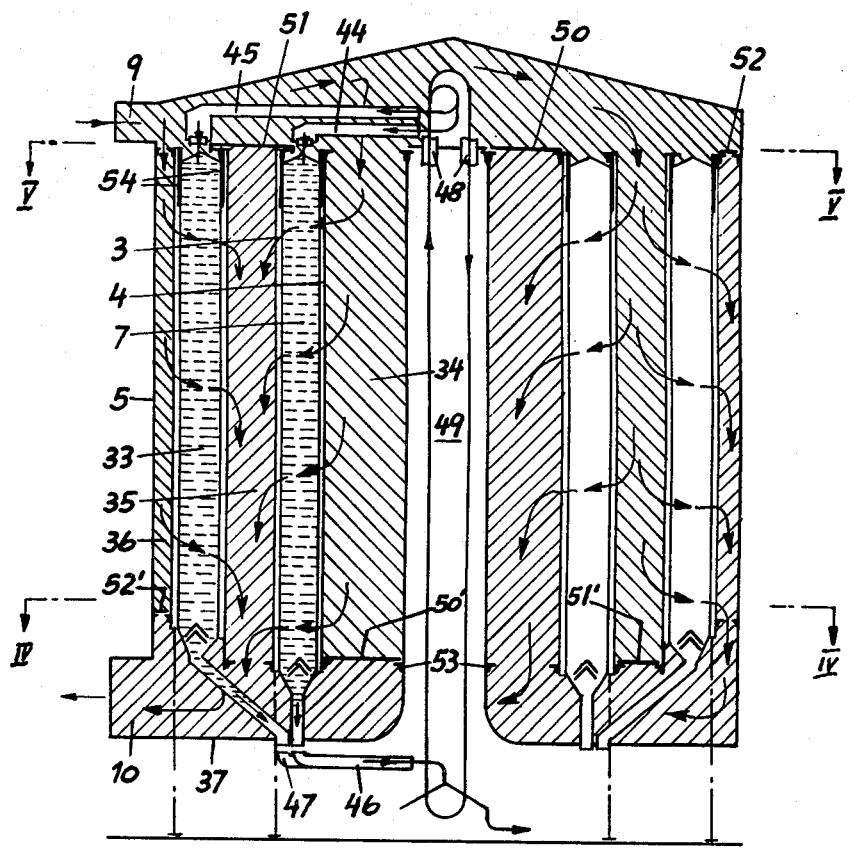
FIG. 3 is a longitudinal sectional view through a purification apparatus according to another embodiment of the invention.
Figure 5:
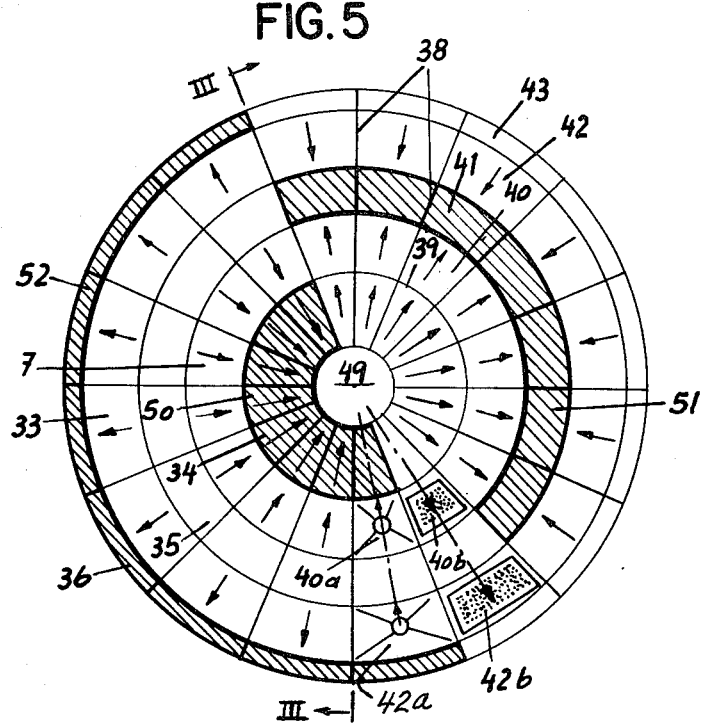
FIG. 5 is a cross sectional view taken along the line V—V in FIG. 3.
Figure 4:
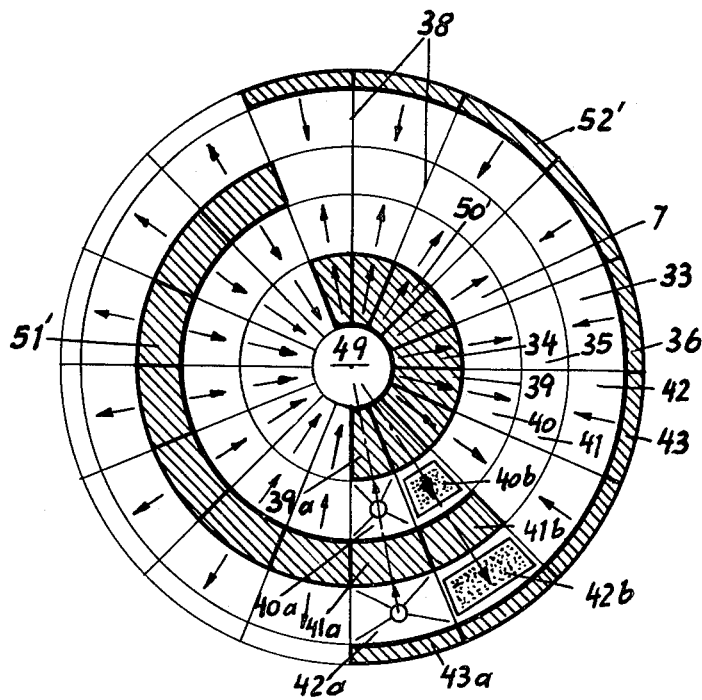
FIG. 4 is a cross sectional view taken along the line IV—IV in FIG. 3.

FIGS. 3 to 5 show a throughfeed filtering apparatus which is analoguous to the apparatus for the purification of combustion gases shown in FIGS. 1 and 2. However, the apparatus in FIGS. 3 to 5 includes in addition a further filtering material layer and a device which reverses the direction of the flow of the combustion gases through the layers of filtering material.

Thus the embodiment of FIGS. 3 to 5 includes a second filtering material layer 33 which is concentrically spaced at a distance from the filter material layer 7. Directional gas channels 34, 35 and 36 are included in this embodiment. The gas channel 35 separates the layers of filtering material 7 and 33 and serves equally both of these layers of filtering material. The connecting pipe 10 which serves to exhaust the purified combustion gases is arranged below the layers of filtering material 7 and 33 and above the bottom 37 of the device.

FIGS. 4 and 5 show that the layers of filtering material 7 and 33 as well as the directional gas channels 34, 35 and 36 are divided by radially and vertically arranged intermediate partitions into the single segments 39, 40, 41, 42 and 43. A feeding means 44 and 45 is arranged above segments 40b, 42b. The subjacent segments 40b, 42b and segments 40a, 42a of the filtering material layers 7 and 33 are excluded from the stream of combustion gases and it is during this time that the filtering material is renewed after each filtering cycle. The segments 40a and 42a are used for discharging by proportionating discharge pipes 46 and 47 which constantly draw out the filtering material in controlled amounts. The discharge pipes 46 and 47 are connected to the lower part of an elevator or hoist means 48 which is arranged in the central internal space 49 of the device. From here the filtering material is transferred to the regenerating facility. Regenerated filtering material is transferred to the segments 40b and 42b by aid of the elevator or hoist means 48 and its connecting feed pipes 44, 45 which are fastened to the upper part of the hoist means 48. The feeding means 44, 45 and the discharge pipes 46, 47 including the hoist means 48 are arranged to rotate around the central axis of the apparatus by rotating means not shown. The pipes 44, 45 and 46, 47 are moved or rotated forwardly by one segment so that the discharging and charging processes may proceed to the next segment. The hoist means 48 which is connected therewith also rotates the same angle. The arrows in the drawings indicate the direction of flow.

The gas channels 34, 35 and 36 are capped at their upper and lower ends with sealing plates 50, 51, 52 and 50′ 51′ and 52′ respectively which rest upon supports 53 and which are pressed onto the supports by the pressure of the gases. The sealing plates 50, 51, 52 or 50′, 51′, 52′ can be rotated concentrically relative to the certical axis of the device by a drive not shown in the drawing. The sealing plates are arranged in such a way that they alternatingly cover one-half, or other proportions, of the segments 39, 41, 43 belonging to or associated with the gas channels 34, 35, 36 respectively. The plates 50, 51, 52 and 50', 51', 52' are staggered relative to each other on top and bottom of the device thus closing each time at its end the individual segments 39, 41, 43 which belong to or are associated with segments 40 or 42 of the layers of filtering mass 7 or 33.

The sealing plates 50, 51, 52 and 50', 51', 52' serve to determine the desired direction of the flow of gases through the layers of filtering material. The mode of action for the control of the direction of the gas stream is suggested and indicated in FIGS. 4 and 5. To this effect the sealing plates 50 and 52 are displaced in such a way that they cap the upper ends of the segments 39 and 43 of the gas channels 34 and 36 which lead to the also closed segments 39a and 43a respectively. Simultaneously the lower ends of these segments are open as can be seen in FIGS. 3 and 4. The sealing plate 51 seals similarly at its upper end the segment 41 which is adjacent to segment 41b. Accordingly, this is the cause of the direction of the gas stream shown in FIGS. 4 and 5 because the combustion gases are introduced through the inlet connection 9 from above. In accordance with these facts the spaces which are occupied by either non-purified combustion gas or purified gas are hatched differently in FIG. 3. Thus, in FIG. 3 the hatching shown sloping downwardly from left to right represents the non-purified combustion gas and the hatching shown sloping downwardly from right to left represents the purified gas.

At the beginning of the filtering cycle the combustion gases pass towards the inside of the filter material layer 33 in the illustrated device having the two concentric filtration material layers 7 and 33, and then, at the end of the filtering cycle, the gases pass from the inside towards the outside. The reversal of gas flow also occurs in the opposite direction in filtering layer 7. The described change of gas flow direction is the most advantageous one for the illustrated traversing filtering apparatus.

Another method for displacing the sealing plates is also capable of changing the direction of flow of the gases through the filter layers. It is important though that each layer of filtering material is traversed in both directions in each filtering cycle. If there is only one layer of filtering material present it will at first be traversed only from the outside towards the inside, and when approaching the end of the charge cycle, from the inside towards the outside. The arrangement of the sealing plates in FIGS. 4 and 5 would have to be changed accordingly. It is also possible to traverse all filtering material segments at first in one direction and then afterwards in the other direction.

According to FIG. 3 the topmost part of the walls which enclose the layers of filtering material 7 and 33 is fabricated from sheet metal 54 having no openings at all. The height of these sheet metal walls 54 is approximately twice the breadth of the filtering material layers 7 and 33. The combustion gases pass generally in an axial direction through the space enclosed by the sheet metal wall 54. With this arrangement is prevented the formation of channels with the concurrent danger of inflammation of the filter mass.

While the invention has been described by means of specific examples and in specific embodiments, it is not intended to be limited thereto, for obvious modifications will occur to those skilled in the art without departing from the spirit and scope of the invention.

What is claimed is:

1. Apparatus for the purification of combustion gases comprising a housing, inlet means for admitting combustion gases to said housing, outlet means for discharging purified gases from said housing, two substantially vertical perforated walls disposed in said housing, said perforated walls being spaced from one another and defining a filtering chamber therebetween, a filtering material substantially filling said filtering chamber, partitioning means partitioning said filter chamber into a plurality of at least three operable segments, a rotatably mounted control cover mounted in said housing and operable to selectively preclude the flow of combustion gases to at least two of said filter segments while permitting the combustion gases to flow to at least one of the remaining filter segments, and charging means for charging filter material into one of said two filter segments to which flow has been precluded by said control cover, said charging means being coupled to said rotatably mounted cover.

2. Apparatus according to claim 1 wherein said charging means includes a swingably mounted feed conduit for said filter material, and braking means mounted on said charging means and vertically movable inside the filter segment to be filled such that the filtering material being fed from said feed conduit falls on to said braking means as the latter is raised vertically as the filter segment progressively fills.

3. Apparatus according to claim 2 wherein said braking means includes a frame having a plurality of absorbing elements, said absorbing elements being made of rubber-like material and being arranged to correspond substantially to the cross section area of said filter segment.

4. Apparatus according to claim 3 wherein said absorbing elements are made of dead soft silicon rubber parts arranged alternatingly side by side to one another, and in vertical layers.

5. Apparatus according to claim 3 wherein said absorbing elements are made of dead soft silicon rubber arranged alternatingly above and below one another.

6. Apparatus for the purification of combustion gases comprising a housing, inlet means for admitting combustion gases to said housing, outlet means for discharging purified gases from said housing, two substantially vertical perforated walls disposed in said housing, said perforated walls being arranged as spaced concentric cylinders to define therebetween a filtering chamber having an annular cross-sectional configuration, a filtering material substantially filling said filtering chamber, partitioning means partitioning said filter chamber into a plurality of at least three operable filter segments, said partitioning means comprising at least three radially and vertically disposed partition walls dividing said housing into at least three filter segments, a rotatably mounted control cover mounted in said housing and operable to selectively preclude the flow of combustion gases to at least two of said filter segments while permitting the combustion gases to flow to at least one of the remaining filter segments, charging means for charging filter material into one of said two filter segments to which flow has been precluded by said control cover, and sealing means operable to cause the direction of flow of combustion gases through said filtering material to be reversed as each filter segment passes through a filtering cycle.

7. Apparatus according to claim 6 further comprising means defining gas channels disposed radially inwardly and radially outwardly of said filter chamber, and wherein at the beginning of said filtering cycle the combustion gases are directed through said filtering material radially from the outside towards the inside and at the end of said filtering cycle the combustion gases are directed through said filtering material radially from the inside toward the outside.

8. Apparatus according to claim 7 wherein two pairs of substantially vertical perforated walls are disposed in said housing to define two filtering chambers, said gas channels being disposed radially inwardly and radially outwardly of each of said filter chambers, said partitioning means also partitioning said gas channels into a plurality of gas channel segments to provide gas channel segmets associated with respective filter chamber segments, said sealing means being located at least partially at the top and bottom of said gas channels and arranged to direct the non-purified and purified combustion gases in such a manner that said gas channel segments belonging to each of said gas channels are alternately closed at their top or bottom except for the gas channel segments which are closed both at their top and bottom by said sealing means in order to serve as actuating closures for leak-proof change-over.

9. Apparatus for the purification of combustion gases comprising a housing, inlet means for admitting combustion gases to said housing, outlet means for discharging purified gases from said housing, two pairs of spaced and substantially vertical perforated walls disposed in said housing to define two annular filtering chambers, said two filter chambers being concentrically spaced from one another to define an annular space therebetween, said annular space defining a common gas channel, means defining a plurality of gas channels disposed about said filtering chambers, a filtering material of the same composition substantially filling said two filtering chambers, partitioning means partitioning said two filter chambers into a plurality of at least three pairs of operable filter segments, and a rotatably mounted control cover mounted in said housing and operable to selectively preclude the flow of combustion gases to at least two of said pairs of filter segments while permitting the combustion gases to flow to at least one of the remaining pairs of filter segments.

10. Apparatus according to claim 9 including a separate charging chute for charging the filter segments in each filter chamber, a separate metering discharge conduit for said filter segments in each filter chamber, and a common filling means connected to said charging chute of each filter chamber for filling the filter segments of both said filter chambers.

11. Apparatus for the purification of combustion gases comprising a housing, inlet means for admitting combustion gases to said housing, outlet means for discharging purified gases from said housing, two substantially vertical perforated walls disposed in said housing, said perforated walls being spaced from one another and defining a filtering chamber therebetween, a filtering material substantially filling said filtering chamber, partitioning means partitioning said filter chamber into a plurality of at least three operable filter segments, said vertical walls defining said filter chambers having uppermost portions which are non-perforate to a longitudinal length greater than the cross-sectional thickness of the filter segment in which the filtering material is disposed, said combustion gases passing from the top downwardly upon that portion of the filter material which is situated between said non-perforate sections of said vertical walls, and a rotatably mounted control cover mounted in said housing and operable to selectively preclude the flow of combustion gases to at least two of said filter segments while permitting the combustion gases to flow to at least one of the remaining filter segments.

* * * * *